March 12, 1935.　　A. Y. DODGE　　1,993,878
LUBRICATING DEVICE
Filed Oct. 15, 1932　　2 Sheets-Sheet 2

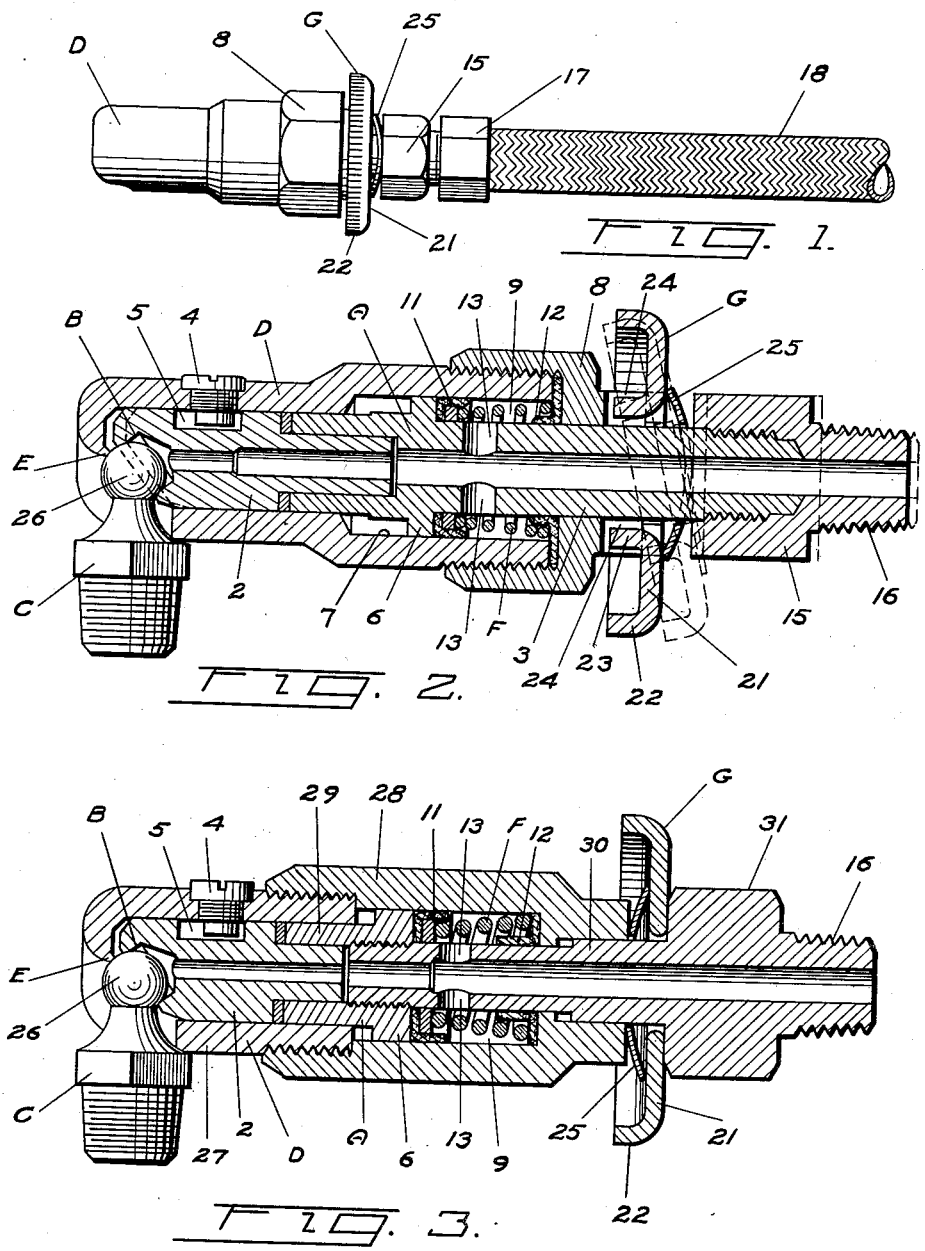

INVENTOR.
ADIEL Y. DODGE
BY
ATTORNEY.

Patented Mar. 12, 1935

1,993,878

UNITED STATES PATENT OFFICE 1,993,878

LUBRICATING DEVICE

Adiel Y. Dodge, South Bend, Ind., assignor to The Lubrication Corporation, South Bend, Ind., a corporation of Delaware Application October 15, 1932, Serial No. 637,918

15 Claims. (Cl. 285—91)

This invention relates to improvements in lubricating devices and more particularly to lubricant discharge nozzles of the clamp type.

An object of the invention is to provide a clamp type lubricant discharge nozzle incorporating mechanism for initially clamping the nozzle upon a lubricant receiving fitting so that the nozzle may be held in position upon the fitting with its discharge conduit pressed into engagement with the fitting head prior to the functioning of the primary clamping mechanism of the nozzle.

Another object is to provide a lubricant discharge nozzle which may be quickly and easily attached and detached to and from a lubricant receiving fitting independently of the primary clamping mechanism.

Other objects, the advantages and uses of the invention will be, or should become apparent after reading the following description and claims and after consideration of the accompanying drawings forming a part of this specification, in which:

Fig. 1 is a side elevation of a lubricant discharge nozzle constructed in accordance with the invention;

Fig. 2 is a sectional view of the nozzle illustrated in Fig. 1;

Figure 4:
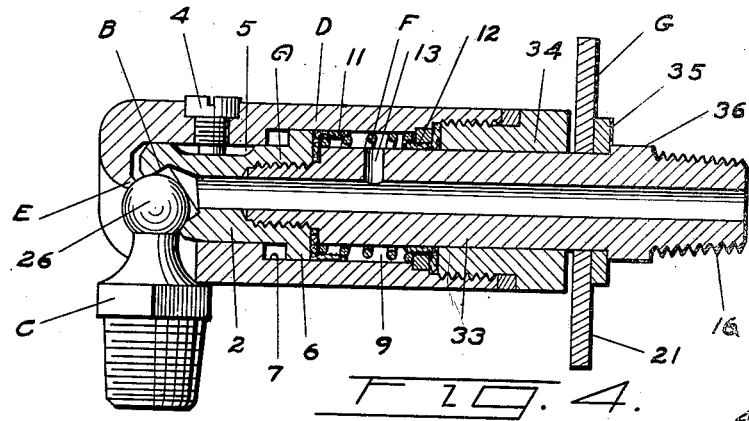
Figure 5:
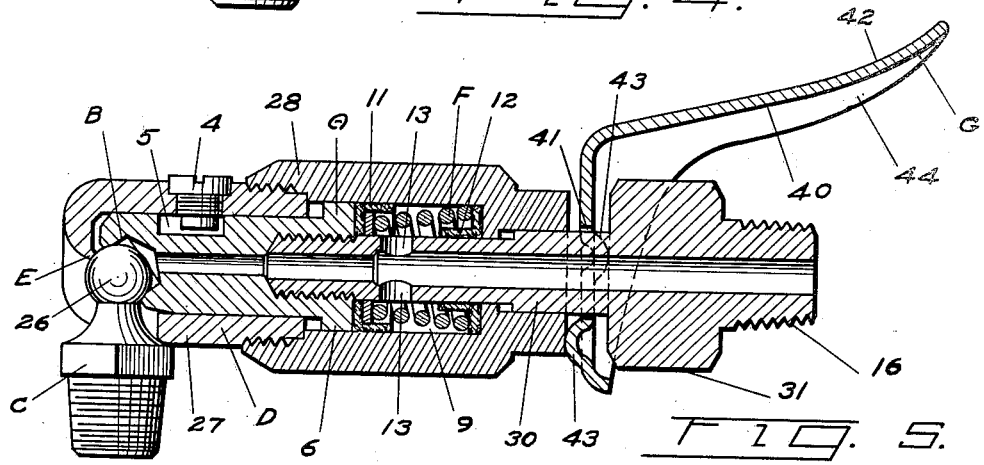
Figure 6:
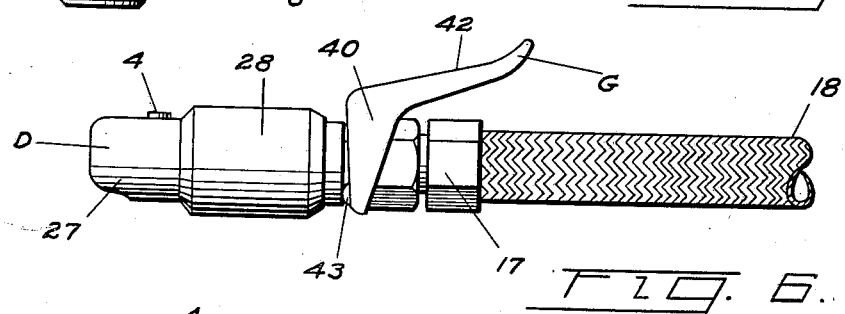

Figs. 3, 4, and 5 are sectional views of modified forms of the nozzle;

Fig. 6 is a side elevation of the nozzle illustrated in Fig. 5; and

Figure 7:
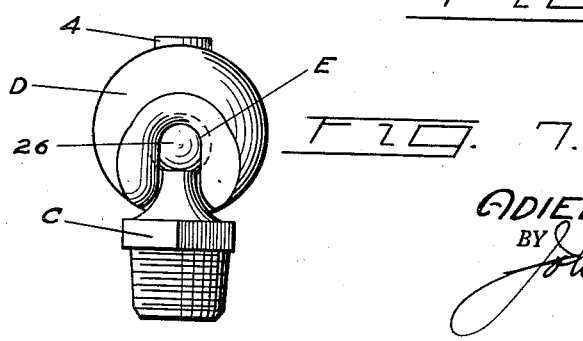

Fig. 7 is a front end elevation illustrating the clamping jaw employed in each of the nozzles shown.

In general, the lubricant discharge nozzles selected for illustration herein comprise a lubricant conduit assembly A having one end adapted for connection to a source of lubricant supply and having the other end provided with a discharge orifice B the walls of which are adapted to provide an annular sealing contact with the spherical head of a lubricant receiving fitting C, a tubular clamping member D having a fitting engaging jaw E, a spring F for urging the conduit and clamping jaw yieldingly toward one another, a manually operable member G for opposing the force of the spring F, and lubricant pressure operated means for causing relative movement between the conduit assembly A and the clamping member D to clamp the nozzle upon the head of the fitting C.

With reference to Figs. 1 and 2 of the drawings, the conduit assembly A may consist of two aligned conduit members 2 and 3 respectively joined to form a swivel connection therebetween. The member 2 includes the discharge orifice B and is fixed against rotation relative to the tubular member D and clamping jaw E by a stud screw 4 carried by the member D which extends into a slot 5 formed in the wall of the conduit member 2. The conduit member 3 has a portion 6 of enlarged diameter located within a diametrically enlarged portion 7 of the bore of the tubular member D. The rearward end of the member D may be closed by a bushing 8 through which the conduit member 3 extends thus providing an annular pressure chamber 9, one wall of which is represented by the enlarged portion 6 of the conduit member 3. Packing members 11 and 12 preferably of rawhide are provided for sealing the contacting regions of the conduit and the member D and bushing 8 respectively. The spring F is disposed within the chamber 9 and in addition to performing its primary function as described serves to hold the packing members 11 and 12 in place as shown. Transverse passages 13 are provided through the walls of the conduit member 3 to establish communication between the bore of the conduit and the pressure chamber 9. A nipple 15 is secured to the rearward end of the conduit 3 by threaded engagement therewith and is provided with an externally threaded portion 16 for connection to the end fitting 17 of a lubricant conducting hose 18 forming a part of the pressure feed lubricant supply for the nozzle.

The manually operable member G, in this form of the nozzle, comprises a metal annulus 21 disposed about the conduit member 3 between the adjacent ends of the bushing 8 and nipple 15. A forwardly extending flange 22 is formed upon the outer edge of the annulus 21, the outer wall of which may be knurled to facilitate manual engagement with the member G as required during the operation of the nozzle. Forwardly extending fingers 23 are formed upon diametrically opposite portions of the annulus 21 and extend within recesses 24 in the bushing 8 formed by slotting the rearward end of the bushing. The member G is thus fixed against rotation about the axis of the conduit yet is free to tilt under manually applied force as to the position indicated in dotted lines of Fig. 2. A spring washer 25 is located between the member G and the nipple 15 which acts to hold the member G yieldingly in the position shown in Fig. 2 against the end of the bushing 8.

In use the operator may support the discharge nozzle by manually grasping the hose 18 near the nipple 15 so that the thumb may rest upon the flanged edge of the member G. While holding the nozzle as thus described the operator may, by pressing forwardly upon the upper side of the member G, cause the member G to tilt to the position shown in dotted lines of Fig. 2, thereby compressing the spring washer 25 and urging the tubular member D with the clamping jaw E forwardly with respect to the conduit assembly A against the force of the spring F. The nozzle may at this time be engaged with the head 26 of the lubricant receiving fitting C by causing the aligned clamping jaw E and adjacent walls of the discharge orifice B to embrace the head of the fitting. The operator may now release the member G thereby restoring the effectiveness of the spring F to urge the conduit assembly A and clamping member D toward one another to attach the nozzle yieldingly to the head of the fitting C. Lubricant under pressure may now be fed through the hose 18 into the nozzle where it may act to expand the pressure chamber 9 to add to the clamping force of the spring F an amount in proportion to the lubricant pressure present in the nozzle conduit. This latter function of the nozzle assures a contact seal between the fitting head 26 and the walls of the discharge orifice B which is in proportion to the lubricant pressure to which the contacting areas are subjected. Subsequent to shutting off the supply of lubricant to the nozzle it may be readily detached from the fitting head by again pressing forwardly upon the member G to cancel the effect of the spring F.

In Fig. 3, another form of the nozzle is shown which is similar in most respects to that of Figs. 1 and 2 and wherein like reference numerals have been employed to designate like parts. The clamping member D however is made of two parts 27 and 28 respectively of different internal diameters thereby providing the chamber 9 within the rearward part 28 of the clamping member and eliminating the use of the bushing 8. The conduit assembly A includes three members 2, 29 and 30 respectively, the flange 6 being formed on the member 29 whereas the passages 13 are located through the walls of the member 30. The nipple 15 is eliminated by forming its structural counterpart integral with the conduit member 30.

The member G is rotatably mounted upon the conduit member 30 between the end of the clamping member element 28 and the enlarged portion 31 of the conduit member 30 corresponding to the body of the nipple 15. The spring washer is disposed between the member G and the element 28 of the clamping member D.

In operation, this form of the nozzle is employed in precisely the same manner as described in connection with the nozzle of Figs. 1 and 2.

A further form of the nozzle is illustrated in Fig. 4 wherein the conduit assembly A comprises two members 2 and 33 respectively in which the flange 6 is formed upon the member 2. The rearward end of the tubular clamping member D is closed by a screw plug 34 thereby forming the annular chamber 9 about the conduit member 33. The member G is formed of a metal annulus 21 loosely fitted between the end of the screw plug 34 and a washer 35 disposed about the conduit member 33 and arrested against rearward lateral movement by a flange 36 formed upon the outer wall of the conduit member 33. Operation of the nozzle is the same as that of the nozzles of Figs. 1 to 3, inclusive.

A still further form of the nozzle is illustrated in Figs. 5 and 6 which differs from the nozzles heretofore described in the structure of the member G. In this form of the nozzle the member G comprises a metal stamping 40 having an opening 41 through which the conduit member 30 extends so as to locate the member between the rearward end of the clamping member D and the enlarged portion 31 of the conduit member 30. The member G further includes a rearwardly extending finger grip 42 overhanging the adjacent end of the hose 18 and hose fitting 17. The body of the member G has a plurality of embossed portions 43, three in the present embodiment of the nozzle, extending forwardly and rearwardly of the body, below and above the axis of the conduit respectively. This arrangement causes the clamping member D to be thrust forwardly of the conduit assembly A to compress the spring F when the finger grip 42 is pressed toward the conduit or hose 18. Webbing 44 may be provided for the member G to lend rigidity to the finger grip portion 42.

In operation, the thumb of the user's hand may be held upon the finger grip 42 and slight pressure applied thereto, which, due to the leverage attained will cause relative movement between the clamping member and conduit assembly to admit the head of the fitting between the jaw E and adjacent walls of the discharge orifice B.

It is to be understood that the described embodiments of the invention herein set forth are presented for the purpose of illustration only, and various changes may be made therein without departing from the spirit and scope of the invention.

I claim:

1. A clamp type coupler for fluid receiving fittings comprising, a conduit adapted for connection to a source of fluid supply, a clamping member, resilient means cooperating with said conduit and said clamping member to clamp said conduit upon a fluid receiving fitting, and manually operable means for rendering said resilient means ineffective at will, said last named means including an annular member surrounding said conduit and tiltingly engageable with adjacent portions of said conduit and said clamping member.

2. A clamp type coupler for fluid receiving fittings comprising, a conduit adapted for connection to a source of fluid supply, a clamping member, resilient means cooperating with said conduit and said clamping member to clamp said conduit upon a fluid receiving fitting, and a manually operable member for causing relative movement between said conduit and said clamping member against the force of said resilient means comprising an annular disc disposed about a portion of said conduit and engageable with the clamping member, said disc being normally held in a plane perpendicular to the axis of the conduit and tiltable out of said plane to cause relative movement between the clamping member and conduit.

3. A clamp type coupler for fluid receiving fittings comprising a conduit having one end adapted for connection to a source of fluid supply and the other end provided with a discharge orifice, a clamping member slidably mounted upon said conduit and provided with a clamping jaw in registration with the discharge orifice of said conduit, means urging said clamping member rearwardly on said conduit, and a manually operable member for moving said clamping member forwardly of said conduit against the force of said means, said member being located between adjacent portions of the conduit and clamping member and tiltable to urge the members apart.

4. A clamp type coupler for lubrication fittings comprising, a conduit having one end adapted for connection to a source of lubricant supply and the other end provided with a discharge orifice, a clamping member slidably mounted upon said conduit and provided with a clamping jaw in registration with the discharge orifice of said conduit, a spring for urging said clamping member rearwardly on said conduit, a manually operable member for moving said clamping member forwardly of said conduit against the force of said spring, and means for applying additional force to said clamping member for urging it rearwardly of the conduit.

5. A clamp type coupler for lubrication fittings comprising, a conduit adapted for connection to a source of lubricant supply, a clamping member, resilient means cooperating with said conduit and said clamping member to clamp said conduit upon a lubricant receiving fitting, and manually operable means for rendering said resilient means ineffective at will, said last named means including a manually engageable member encompassing said conduit between radially extending surfaces on said conduit and said clamping member respectively and a yielding member urging said manually engageable member against one of said surfaces.

6. A clamp type coupler for lubrication fittings comprising, a conduit adapted for connection to a source of lubricant supply, a clamping member, resilient means cooperating with said conduit and said clamping member to clamp said conduit upon a lubricant receiving fitting, and manually operable means for rendering said resilient means ineffective at will, said last named means including a manually engageable member encompassing said conduit between radially extending surfaces on said conduit and said clamping member respectively, said member having a portion at its outer edge extending laterally substantially parallel to the axis of said conduit.

7. A clamp type coupler for lubrication fittings comprising, a conduit adapted for connection to a source of lubricant supply, a clamping member, means cooperating with said conduit and said clamping member to clamp said conduit upon a lubricant receiving fitting, and manually operable means for rendering said last named means ineffective at will, said manually operable means including a manually engageable member encompassing said conduit between radially extending surfaces on said conduit and said clamping member respectively and free to tilt relative to the axis of said clamping member, said member being provided with embossed portions contacting the clamping member and conduit respectively.

8. A clamp type coupler for lubrication fittings comprising, a conduit adapted for connection to a source of lubricant supply, a clamping member, resilient means cooperating with said conduit and said clamping member to clamp said conduit upon a lubricant receiving fitting, and manually operable means for rendering said resilient means ineffective at will, said last named means including a manually engageable member encompassing said conduit between radially extending surfaces on said conduit and said clamping member respectively and tiltable to cause relative movement between the clamping member and the conduit, said member being provided with embossed portions contacting the clamping member and conduit respectively.

9. A clamp type coupler for lubrication fittings comprising, a pair of sleeve members in telescopic arrangement, the inner of said sleeves comprising a lubricant conduit and the outer of the sleeves having a clamping jaw cooperating with the adjacent end of the inner sleeve to clamp a lubricant receiving fitting therebetween, a spring normally urging said sleeves in a direction to move said jaw toward said adjacent end of the inner sleeve, and a member surrounding the inner sleeve and extending radially beyond the outer wall of the outer sleeve and engageable with both of the sleeves for causing relative movement between said sleeves against the force of said spring when said member surrounding said inner sleeve is moved from its normal position.

10. A coupler for clamping engagement with a lubricant receiving fitting comprising, inner and outer sleeve members, one of said sleeve members being adapted at one end to project beyond the corresponding end of the other sleeve member, said ends of said sleeve members being adapted to engage and clamp a fitting therebetween, resilient means interposed between said members and normally urging said corresponding ends into clamping position, an abutment on said outer sleeve, an abutment on the inner sleeve in spaced and opposed relation to the abutment on said outer sleeve, and a lever fulcrumed on one of said abutments and engageable with the other abutment for moving said sleeves relative to one another against the normal urge of said resilient means.

11. A coupler for clamping engagement with a lubricant receiving fitting comprising, inner and outer sleeve members, one of said sleeve members being adapted at one end to project beyond the corresponding end of the other sleeve member, said ends of said sleeve members being adapted to engage and clamp a fitting therebetween, resilient means interposed between said members and normally urging said corresponding ends into clamping position, an abutment encircling each of said sleeves, said abutments being disposed in opposed relation to one another, and a ring-type lever disposed between said abutments, said lever being adapted to fulcrum upon one of said abutments and to engage with the opposite abutment circumferentially of each abutment whereby to urge said corresponding ends of said sleeves from fitting clamping position.

12. A clamp type coupler for fluid receiving fittings comprising, a conduit adapted for connection to a source of fluid supply, a clamping member, means cooperable with said conduit and said clamping member to clamp said conduit upon a fluid receiving fitting, and manually operable means for rendering said first named means ineffective at will, said last named means including an annular member surrounding said conduit and tiltingly engageable with the adjacent portions of said conduit and said clamping member.

13. A clamp type coupler for fluid receiving fittings comprising, a pair of sleeve members in telescopic arrangement, the inner of said sleeves comprising a fluid conduit and the outer of said sleeves having a clamping jaw cooperating with the adjacent end of the inner sleeve to clamp a fluid receiving fitting therebetween, means operable to urge said sleeves in directions relative to one another to move said jaw toward said adjacent end of the inner sleeve, and a member surrounding the inner sleeve and extending radially beyond the outer wall of the outer sleeve and engageable with both of the sleeves for causing relative movement between said sleeves against the force of said means when said member surrounding said inner sleeve is moved from its normal position.

14. In a clamp type coupler for lubrication fittings, a nozzle member, a clamp member cooperative with the nozzle member to clamp a fitting therebetween, fluid pressure responsive means for moving said members relatively whereby to effect clamping of a fitting, and means including a lever interposed between said members and having a plurality of fulcrums with respect to each member for moving said members to fitting releasing position.

15. In a clamp type coupler for lubrication fittings, a nozzle member, a clamp member cooperative with the nozzle member to clamp a fitting therebetween, means for moving said members relatively whereby to effect clamping of a fitting, said members having diametrically opposed shoulders at a plurality of places thereabout, and a lever between said members and surrounding one of said members and adapted to fulcrum against said diametrically opposed shoulders for moving said members relatively against said moving means to move said members to fitting releasing position.

ADIEL Y. DODGE.